United States Patent [19]

McNeil

[11] 4,384,311
[45] May 17, 1983

[54] METHOD FOR CLEANING THE DISC SURFACE AND THE HEAD SUPPORT STRUCTURE IN A MAGNETIC DISC DRIVE

[75] Inventor: Michael McNeil, Lompoc, Calif.

[73] Assignee: DMA Systems Corporation, Santa Barbara, Calif.

[21] Appl. No.: 310,747

[22] Filed: Oct. 13, 1981

[51] Int. Cl.³ .......................... G11B 5/10; G11B 5/12; G11B 5/41

[52] U.S. Cl. ...................................... 360/128; 360/137

[58] Field of Search ............... 360/128, 103, 102, 104, 360/133, 135, 137; 15/210 R; 134/9

[56] References Cited

U.S. PATENT DOCUMENTS

| | | | |
|---|---|---|---|
| 3,839,734 | 10/1974 | George et al. | 360/102 |
| 4,001,892 | 1/1977 | Castelli et al. | 360/133 |
| 4,101,948 | 7/1978 | Tadokoro | 360/137 |
| 4,180,840 | 12/1979 | Allan | 360/128 |
| 4,212,044 | 7/1980 | Plotto | 360/103 |
| 4,241,368 | 12/1980 | Tadokoro | 360/128 |

Primary Examiner—Robert M. Kilgore
Attorney, Agent, or Firm—Spensley, Horn, Jubas & Lubitz

[57] ABSTRACT

In a magnetic disc drive, there is disclosed a method for cleaning the magnetic disc surfaces and the heads. The heads are loaded and caused to fly on the disc surfaces. The spindle motor speed is reduced to a speed where the heads fly at approximately 50% of the normal flying height and the head support structure drive motor is commanded to sweep the heads across the disc surfaces, forward and reverse, for several cycles, to remove any particles down to an elevation that is 50% of the normal flying height. The heads are then positioned over unused tracks on the disc surfaces and the spindle motor speed is reduced to a speed where the heads fly at approximately 25% of the normal flying height so as to scrub off any particles left on the heads. The spindle motor speed is then returned to normal speed and a 25% margin of interference-free operation has been assured.

10 Claims, 2 Drawing Figures

METHOD FOR CLEANING THE DISC SURFACE AND THE HEAD SUPPORT STRUCTURE IN A MAGNETIC DISC DRIVE

BACKGROUND OF THE INVENTION

1. Field of the Invention

The present invention relates to a method for cleaning the disc surfaces and the heads in a magnetic disc drive and, more particularly, to a head cleaning cycle whereby particles embedded on both the heads and the magnetic disc surfaces in a magnetic disc drive may be dislodged.

2. Description of the Prior Art

Magnetic disc storage systems are widely used to provide large volumes of relatively low-cost, computer-accessible memory or storage. A typical disc storage device has a number of discs coated with a suitable magnetic material mounted for rotation on a common spindle and a set of transducer heads carried in pairs on elongated supports for insertion between adjacent discs, the heads of each pair facing in opposite directions to engage opposite faces of the adjacent discs. The support structure is coupled to a positioner motor, the positioner motor typically including a coil mounted within a magnetic field for linear movement and oriented relative to the discs to move the heads radially over the disc surfaces to thereby enable the heads to be positioned over any annular track on the surfaces. In normal operation, the positioner motor, in response to control signals from the computer, positions the transducer heads radially for recording data signals on, or retrieving data signals from, a pre-selected one of a set of concentric recording tracks on the discs.

The transducer heads are supported above the disc surfaces by a film of air to prevent contact therebetween which might otherwise damage one or both members. The heads are typically designed to actually fly above the disc recording surfaces at heights of less than 50 microinches.

Modern magnetic disc drives incorporate rigid substrate discs, the surfaces of which are polished to a high finish so that the heads can reliably fly on the air bearing. Systems are presently being developed wherein the heads fly above the disc recording surfaces at heights of less than 20 microinches. Such a disc drive typically incorporates a filtered air system to control the cleanliness of the head flying environment.

Regardless of the care taken to maintain cleanliness of the head flying environment, the probability remains high that contamination particles may be present in the head flying environment and that such particles may become deposited on either the heads or the disc surfaces. This is especially the case in removable media disc drives wherein a disc pack or cartridge is removed from the disc drive. The presence of these lodged particles may affect the flight attitude of the heads and thereby reduce their ability to record and retrieve data from the disc surfaces. In the extreme, the presence of disc contamination may cause a crash of a flying head, causing destruction of the head and/or disc. Accordingly, it becomes important to provide a method and apparatus for cleaning the disc surfaces and the heads in a magnetic disc drive.

SUMMARY OF THE INVENTION

According to the present invention, there is provided a method for cleaning the disc surfaces and the heads in a magnetic disc drive. Following the teachings of the present invention, a head cleaning cycle is incorporated into a magnetic disc drive whereby particles embedded on both the heads and the magnetic disc surfaces may be dislodged. This is achieved through a specially designed low-flying cleaning cycle. By allowing the heads to fly at a spacing below their normal flying height, particles embedded on both the heads and the discs may be dislodged. By wearing away all contamination particles on both heads and discs down to a level well below normal flying height, reliable flight can be achieved at normal flying heights.

Briefly, in a disc drive including a disc having a magnetic surface and supported for rotation on a spindle, a spindle motor for driving the spindle, a transducer head, a head support structure, a drive motor for moving the head along the disc surface, and control electronics for controlling the drive motor and the speed of the spindle motor, there is disclosed a method for cleaning the disc surface and the head comprising loading and flying the head on the disc surface, reducing the spindle motor speed to a speed where the head flies at approximately 50% of the normal flying height, moving the head back and forth across the disc surface, for several cycles, to remove any particles down to an elevation that is 50% of the normal flying height, positioning the head above an unused track on the disc surface, reducing the spindle motor speed to a speed where the head flies at approximately 25% of the normal flying height so as to scrub off any particles left on the head, and increasing the spindle motor speed to a speed where the head flies at the normal flying height.

OBJECTS, FEATURES AND ADVANTAGES

It is therefore the object of the present invention to solve the problems associated with cleaning the disc surfaces and the heads in a magnetic disc drive. It is a feature of the present invention to solve these problems by the provision of a low-flying head cleaning cycle whereby particles embedded on both the heads and the magnetic disc surfaces in a magnetic disc drive may be dislodged. An advantage to be derived is the assurance of interference-free operation. A further advantage is the minimization of problems associated with lodged particles affecting the flight attitude of the heads. A still further advantage is the increase in the heads ability to record and retrieve data from magnetic discs. Another advantage is the minimization of the likelihood of disc contamination causing a crash of the flying heads.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

DESCRIPTION OF THE PREFERRED EMBODIMENT

Figure 1:
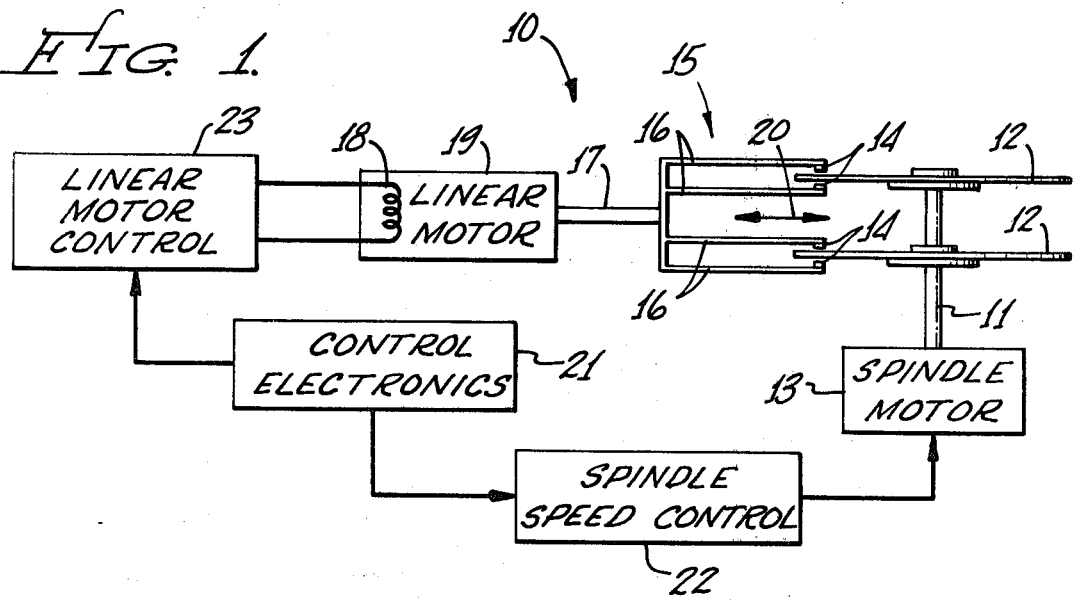
FIG. 1 is a generalized block diagram of the electronic control system of a typical magnetic disc drive.

Referring now to the drawings and, more particularly, to FIG. 1 thereof, there is shown the components of a conventional magnetic disc drive, generally designated 10, which includes a spindle 11 supporting one or more magnetic discs 12. As is well known in the art, discs 12 may either be fixed to spindle 11 or user-replaceable. Spindle 11 is driven by a spindle motor 13 which rotates discs 12 about an axis defined by spindle 11.

Modern magnetic disc drives incorporate rigid substrates for discs 12. As is well known in the art, these substrates have a magnetic material coated on either one or both surfaces thereof to enable data to be magnetically recorded thereon. Data is recorded on the disc surfaces by signals applied to magnetic transducers 14, typically referred to as "heads". In a typical disc drive, a head support structure 15 is provided, structure 15 typically including, for each disc 12, a support arm 16, all of which arms 16 are connected to a common carriage 17. Carriage 17 is physically coupled to a positioner coil 18 of a linear positioner motor 19 which, in response to the application of positioning signals thereto, is capable of linearly moving support structure 15 in the direction of arrows 20. Support structure 15 is mounted relative to discs 12 so that heads 14 may move radially with respect to the recording surfaces of discs 12. That is, support structure 15 can be moved linearly to enable heads 15 to be selectively positioned over any one of a plurality of annular recording tracks defined on the disc recording surfaces.

While motor 19 has been described as being a linear motor, since such is the preferred embodiment of the present invention, it need not be such. Other types of motors are well known for moving support structure 15 with respect to the recording surfaces of discs 12, such as swing arms, lead screw types, and the like, and the present invention is equally applicable to such other types.

Magnetic disc drive 10 is typically controlled by signals from control electronics 21, typically a programmed microprocessor. Control electronics 21 controls the speed of spindle motor 13 via spindle speed control circuit 22 and controls the radial position of heads 14 via a linear motor control circuit 23. The output of speed control circuit 22 is applied to spindle motor 13, whereas the output of linear motor control circuit 23 is applied to coil 18 of linear motor 19. All of the above components of drive 10 are well known to those skilled in the art.

In normal operation, that is, when heads 14 are writing data onto or reading data from the surfaces of discs 12, heads 14 will be loaded. When heads 14 are loaded, it simply means that a spring force is acting upon heads 14, generally through support arms 16, to urge heads 14 towards the surfaces of discs 12. This force is counteracted by an air cushion caused by the rapid rotation of discs 12 so that heads 14 actually fly immediately above the disc recording surfaces as long as discs 12 are rotating at a certain speed. In magnetic disc drives, the heads may fly at distances less than 50 microinches above the disc surfaces and drive systems are presently being developed wherein the heads may fly at distances of less than 20 microinches above the disc surfaces.

Even though steps are taken to maintain cleanliness of the head flying environment, the probability remains high that contamination particles will enter and be present in the head flying environment and that these particles may become deposited on either heads 14 or discs 12. This is especially true in removable media disc drives wherein a disc pack or cartridge is removed from the disc drive. The presence of these lodged particles may affect the flight attitude of heads 14 and thereby reduce their ability to record and retrieve data from discs 12. In the extreme, the presence of disc contamination may cause a crash of one of heads 14, causing destruction of the head and/or the associated disc.

It is very common in disc pack drives or disc cartridge drives to incorporate a purging cycle wherein the disc pack is brought up to rotational speed and some period of time is spent with the disc rotating in the presence of a filtered air flow. Special housings and special mechanisms are provided to enhance this air flow. For a further discussion of such a purging cycle, reference should be had to copending application Ser. No. 321,335, filed concurrently herewith, entitled Method for Contaminant Purging and Head Loading in a Magnetic Disc Drive, and assigned to DMA Systems Corporation, the assignee of the present application.

According to the present invention, control electronics 21 is programmed so as to signal spindle speed control circuit 22 to cause spindle motor 13 to rotate at a speed where heads 14 fly at a spacing below their normal flying height. As will be described more fully hereinafter, this permits particles embedded on both heads 14 and discs 12 to be dislodged. By wearing away all contamination particles on both heads 14 and discs 12 down to a level well below normal flying height, reliable flight can be achieved at normal flying height. The dislodged particles are carried away from heads 14 and discs 12 by the circulating air and are trapped in the systems air filter.

It is preferable that spindle motor 13 be a rotating magnet, brushless, DC motor. Such a motor is simple to control through the use of spindle servo electronics so that the spindle speed can be accurately controlled to values significantly below normal operating speeds. However, other motors are equally applicable to the present invention.

Figure 2:
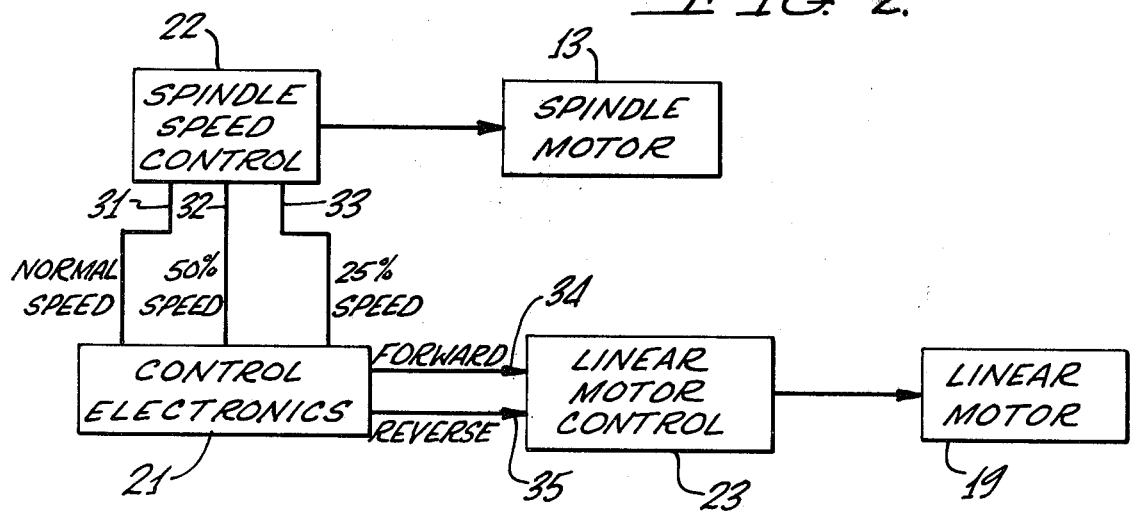
FIG. 2 is a generalized block diagram of the manner in which the system of FIG. 1 may be operated to perform the present method.

Referring now to FIG. 2, the generalized block diagram of magnetic disc drive 10 is modified so that control electronics 21 has three outputs on lines 31, 32 and 33, which are coupled to spindle speed control circuit 22. The output on line 31 signals speed control 22 to cause spindle motor 13 to rotate at its normal speed. The signals on lines 32 and 33 cause spindle motor 13 to reduce its speed to speeds where heads 14 fly at approximately 50% and 25%, respectively, of their normal flying heights. Control electronics 21 also applies signals to linear motor control 23 over lines 34 and 35 to cause linear motor 19 to move heads 14 in forward and reverse directions, respectively.

According to the preferred embodiment of the present invention, heads 14 are loaded and control electronics 21 signals spindle speed control circuit 22 over line 31 to cause heads 14 to fly on the surfaces of discs 12 in a conventional manner. Any other purging cycle may be implemented at this time, such as the cycle of the before-mentioned copending application Ser. No. 321,335.

Control electronics 21 now signals spindle speed control circuit 22 over line 32 to cause spindle motor 13 to reduce its speed to one where heads 14 fly at some predetermined small percentage of the normal flying height. According to the preferred embodiment of the present invention, this flying height is chosen to be approximately 50% of the normal flying height. At this time, linear motor control 23 is commanded over lines 34 and 35 to cause motor 19 to sweep heads 14 across discs surfaces 12, forward and reverse, for several cycles. This action removes any particles from the disc surfaces down to an elevation that is 50% of the normal flying height.

Control electronics 21 then signals motor control 23 to cause motor 19 to move heads 14 to a predetermined location on the surfaces of discs 12. This is preferably chosen to be an unused inner track where there is no data recorded. At the same time, control electronics 21 signals speed control circuit 22 over line 33 to cause spindle motor 13 to reduce its speed to a speed where heads 14 fly at some predetermined smaller percentage of the normal flying height. According to the present invention, this is chosen to be 25% of the normal flying height. This action scrubs off any particles left on heads 14 from the previous steps.

At this time, spindle speed control 22 is signalled over line 31 to cause spindle motor 13 to resume its normal speed and a 25% margin (50%−25%) of interference-free operation has been assured.

Heads 14 should be of low mass and have a low loading force so as to be able to clean the surfaces of discs 12 without heads 14 crashing and/or damaging discs 12. Heads 14 are preferably built as a "composite" transducer, a term common to this industry. That is, heads 14 are preferably composed of a slider which may be made of barium titanate or other suitable long-wearing ceramic and a ferrite transducer element which is glass-bonded into the slider. Such a composite transducer will survive the cleaning process with no damage to the transducer element.

It can therefore be seen that according to the present invention, there is provided a method for cleaning the disc surfaces and the heads in a magnetic disc drive. Following the teachings of the present invention, a head cleaning cycle is incorporated into magnetic disc drive 10 whereby particles embedded on both heads 14 and the magnetic surfaces of discs 12 may be dislodged. By wearing away all contamination particles on both heads 14 and discs 12 down to a level well below normal flying height, reliable flight can be achieved at normal flying heights.

While the invention has been described with respect to the preferred embodiment constructed in accordance therewith, it will be apparent to those skilled in the art that various modifications and improvements may be made without departing from the scope and spirit of the invention. For example, it should be clear that the invention is not limited to two steps of reduced flying heights, as specified. The cleaning cycle may be accomplished with any number of steps. In fact, spindle 11 can be stopped completely with heads 14 on unused tracks for the purpose of cleaning heads 14 of contaminants. Accordingly, it is to be understood that the invention is not to be limited by the specific illustrative embodiment, but only by the scope of the appended claims.

I claim:

1. In a disc drive including a disc having a magnetic surface and supported for rotation on a spindle, a spindle motor for driving said spindle, a transducer head, a head support structure, a drive motor coupled to said head support structure for moving said head along said disc surface, and control means for controlling said drive motor and the speed of said spindle motor, a method for cleaning said disc surface and said head comprising the steps of:

loading and flying said head on said disc surface;
   reducing said spindle motor speed to a speed where said head flies at a first predetermined percentage of the normal flying height;
   moving said head across said disc surface;
   positioning said head at a predetermined location on said disc surface;
   reducing said spindle motor speed to a speed where said head flies at a second predetermined percentage, lower than said first predetermined percentage, of said normal flying height; and
   increasing said spindle motor speed to a speed where said head flies at said normal flying height.

2. In a disc drive according to claim 1, a method wherein said first predetermined percentage is approximately 50%.

3. In a disc drive according to claim 1 or 2, a method wherein said second predetermined percentage is approximately 25%.

4. In a disc drive according to claim 1, a method wherein said step of moving said head comprises the step of:

moving said head back and forth across said disc surface for several cycles.

5. In a disc drive according to claim 1 or 4, a method wherein said predetermined location is an unused track on said disc surface.

6. In a disc drive including a disc having a magnetic surface and supported for rotation on a spindle, a spindle motor for driving said spindle, a transducer head, a head support structure, a drive motor coupled to said head support structure for moving said head along said disc surface, and control means for controlling said drive motor and the speed of said spindle motor, a method for cleaning said disc surface and said head comprising the steps of:

loading and flying said head on said disc surface;
   reducing said spindle motor speed to a speed where said head flies at a predetermined percentage of the normal flying height;
   moving said head back and forth across said disc surface; and
   increasing said spindle motor speed to a speed where said head flies at said normal flying height.

7. In a disc drive according to claim 6, a method wherein said predetermined percentage is approximately 50%.

8. In a disc drive according to claim 6 or 7, a method further comprising the step of:

reducing said spindle motor speed to a speed where said head flies at a second predetermined percentage, lower than said first mentioned predetermined percentage, of said normal flying height.

9. In a disc drive according to claim 8, a method wherein said step of reducing said spindle motor speed to a speed where said head flies at a second predetermined percentage of said normal flying height is performed after the step of moving said head back and forth across said disc surface.

10. In a disc drive according to claim 9, a method wherein said second predetermined percentage is approximately 25%.

* * * * *